United States Patent [19]

Kagiyama et al.

[11] Patent Number: 4,617,757
[45] Date of Patent: Oct. 21, 1986

[54] SLIDING DOOR OPENING-CLOSING MECHANISM

[75] Inventors: Tsutomu Kagiyama; Fumio Kobayashi; Jun Yamagishi, all of Kanagawa; Hiromitsu Nishikawa, Yokohama, all of Japan

[73] Assignee: Ohi Seisakusho Co., Ltd., Yokohama, Japan

[21] Appl. No.: 793,218

[22] Filed: Oct. 31, 1985

[30] Foreign Application Priority Data

Nov. 2, 1984 [JP] Japan .................................. 59-231851
Nov. 2, 1984 [JP] Japan .................................. 59-231852

[51] Int. Cl.$^4$ ............................................. E05F 15/00
[52] U.S. Cl. ....................................... 49/280; 49/213; 49/360
[58] Field of Search ................. 49/280, 279, 360, 210, 49/211, 213, 214, 215

[56] References Cited

U.S. PATENT DOCUMENTS

| 4,462,185 | 7/1984 | Shibuki et al. | 49/280 X |
| 4,530,184 | 7/1985 | Chikaraishi et al. | 49/213 |
| 4,530,185 | 7/1985 | Moriya et al. | 49/280 |

FOREIGN PATENT DOCUMENTS

| 58-28115 | 6/1983 | Japan . |
| 59-170380 | 9/1984 | Japan . |
| 59-170381 | 9/1984 | Japan . |
| 59-186379 | 12/1984 | Japan . |

Primary Examiner—Philip C. Kannan
Attorney, Agent, or Firm—Schwartz, Jeffery, Schwaab, Mack, Blumenthal & Evans

[57] ABSTRACT

A pair of cables to move a sliding door are introduced into the sliding door and connected to a linkage fixed to the sliding door. The linkage transmit part of the power to move the sliding door to a door lock to operate the latch of the door lock. The linkage also takes up slack in the pair of cables when loosened.

12 Claims, 11 Drawing Figures

SLIDING DOOR OPENING-CLOSING MECHANISM

INDUSTRIAL APPLICATION FIELD

This invention relates to an opening-closing mechanism for a vehicle sliding door and, in particular, to such an opening-closing mechanism for a sliding door which is to be power opened and closed through the use of cables, wherein when the sliding door is completely closed, the outside surface of the vehicle will be continuously smooth, and when the sliding door is opened, it will protrude from the surface of the vehicle.

EXPLANATION OF RELATED TECHNOLOGY

There is a sliding door of the type that when the sliding door is completely closed the outside surface of the vehicle is continuously smooth, and when the sliding door is opened, the door protrudes out from the outside surface of the vehicle. In this type of sliding door, when the door is being closed a force is applied causing the door to move in a folding motion. In addition, in order to completely close the door protruding from the vehicle, an insertion force toward the interior of the vehicle is necessary. The direction of this force is traverse to the direction that the door slides as the door is being completely closed. In other words, it is in a direction that is almost at a right angle to the opening and closing direction of the door. Because of this, and also because the door receives a reaction force from the seal around the door, a suitably strong force must be applied to the sliding door in order to close it.

When attempting to power open or close the sliding door, unlike in hand-operation, it is impossible to have fine control over the forces involved. Therefore when attempting to close the door with a strong force as aforementioned, unreasonably strong forces are produced in every part of the mechanism. In some conventional opening-closing mechanisms for sliding doors, the power source for sliding the door open or closed is separate from the power source for inserting the door into place. These power sources are arranged inside the door for example. Because of this the sliding door can be completely closed by even a small force. This kind of mechanism is described in the Japanese Unexamined Publications of patent application Nos. SHO-59-170380 and -170381. The Publications are incorporated into the present specification by reference.

However, in such conventional sliding door opening-closing mechanisms two power sources are necessary in one hand. Also in the other hand, an electrical socket may be necessary to enable electrical contact between the door and the vehicle immediately before the door was completely closed. Because of this, this mechanism requires a large installation space, besides being faced with the problem of increased weight and cost of the vehicle.

This invention is aimed at the problems of these conventional mechanisms. It is therefore, an object of this invention to provide a sliding door opening-closing mechanism that is capable of completely opening and closing the sliding door through the use of only one power source and without generating unreasonable forces and impact to each part of the mechanism.

Another object of this invention is to provide a sliding door opening-closing mechanism that is capable of opening and closing a sliding door through a series of motions generated by a small single power source.

Another object of this invention is to provide a sliding door opening-closing mechanism that is of simplified construction and is reduced in weight in order to contribute to the weight reduction of the entire vehicle, while being capable of bringing the cost down.

Another object of this invention is to provide a sliding door opening-closing mechanism that is not capable of automatically opening the sliding door when the door is locked by the locking-unlocking mechanism, but is capable of opening the door only when the door is unlocked by the locking-unlocking mechanisim.

A further object of this invention is to provide an improved sliding door opening-closing mechanism of which careful consideration is given also to its crime proof capability.

A still further objective of this invention is to provide a sliding door opening-closing mechanism that is capable of furnishing the two different kinds of power necessary for opening and closing the sliding door through the use of a clutch of simple construction.

SUMMARY OF THE INVENTION

In order to obtain the objectives of this invention, an opening cable and a closing cable are installed inside the sliding door. These cables are then connected to the same power source. When closing the door the closing cable is in tension and the door locking latch is forced to move from the half-latched position to the full-latched position so that it mates perfectly with the striker, whereby the sliding door is properly inserted and completely closed. When opening the door, the opening cable is in tension. This causes the door locking latch to be unlocked. When one of the cables is in tension, the other cable is prevented from slacking by a linkage means fixed to the door and connected to both cables.

DETAILED DESCRIPTION OF PREFERRED EMBODIMENTS

Figure 1:
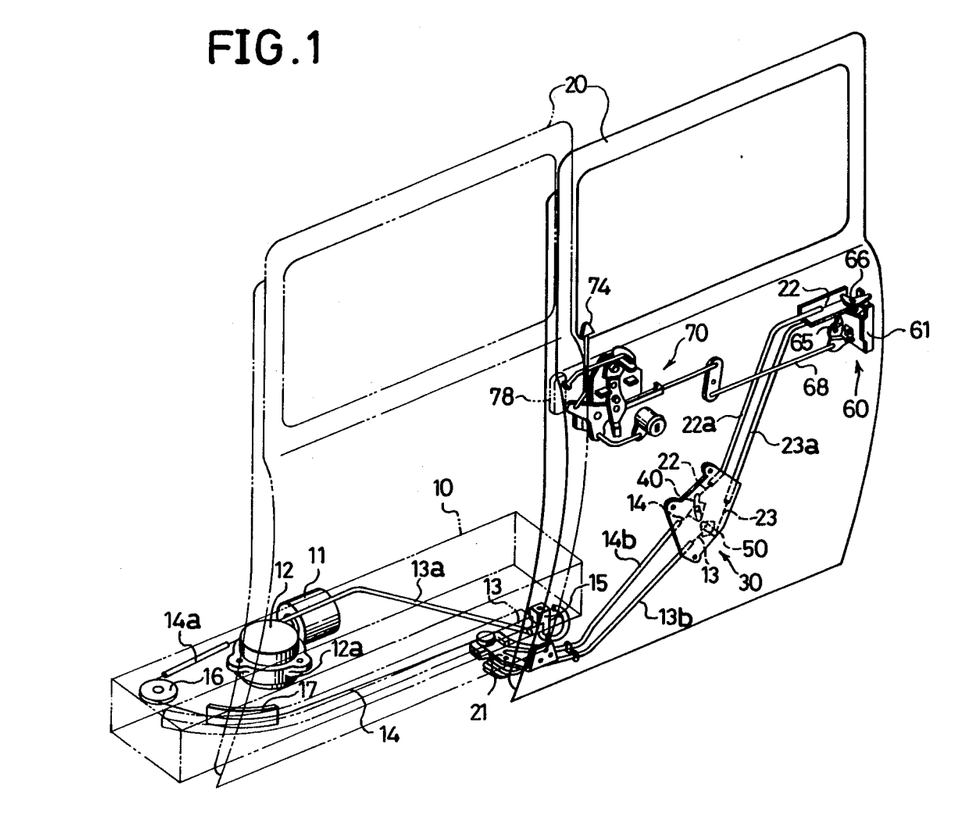
FIG. 1 is a schematic perspective view giving a first example of the sliding door employed in this invention.

A first example of this invention incorporated in a vehicle body 10 is shown in FIG. 1. A sliding door 20 is supported on the vehicle body 10. When sliding door 20 is completely closed the outside surface of the vehicle is continuously smooth. When the sliding door is opened, it protrudes out from the surface of the vehicle. This support structure can be assumed to be the commonly well-known structure.

Arranged on the vehicle body is an operating motor 11 which acts as an actuator, and a drum 12 connected to motor 11 by way of clutch 12a only when motor 11 is operating. A pair of opening cable 13 and closing cable 14 are both connected at the end thereof to and wound in opposite directions around drum 12. A portion of opening cable 13 and closing cable 14 passes through and is directed by outer cases 13a and 14a. An example of the assembly of motor, clutch, and drum are described in Japanese Unexamined Publication of Utility Model application No. SHO-59-186379, which is incorporated by reference into this specification.

The opening cable 13 goes through guide 15 which is fixed to vehicle body 10. The cable is then guided by a groove in the tip of the guide member of drive bracket 21 which is fixed to sliding door 20, and extends to linkage 30 which is also attached to sliding door 20.

Closing cable 14 passes through guide roller 16 and guide shoe 17 which are fixed to vehicle body 10. The cable is then guided by a groove in the tip of the guide member of bracket 21 which is fixed to sliding door 20, and extends to linkage 30 which is also attached to sliding door 20. The position of guide roller 16 and guide shoe 17 is located in front of the front edge of sliding door 20 when the door is completely closed.

Opening cable 13 and closing cable 14 which lead to sliding door 20, pass through and are directed to linkage 30 by outer cases 13b and 14b respectively. A pair of closing and opening linkage cables 22 and 23 are extending from linkage 30 through outer cases 22a and 23a fixed to linkage 30.

Figure 2:
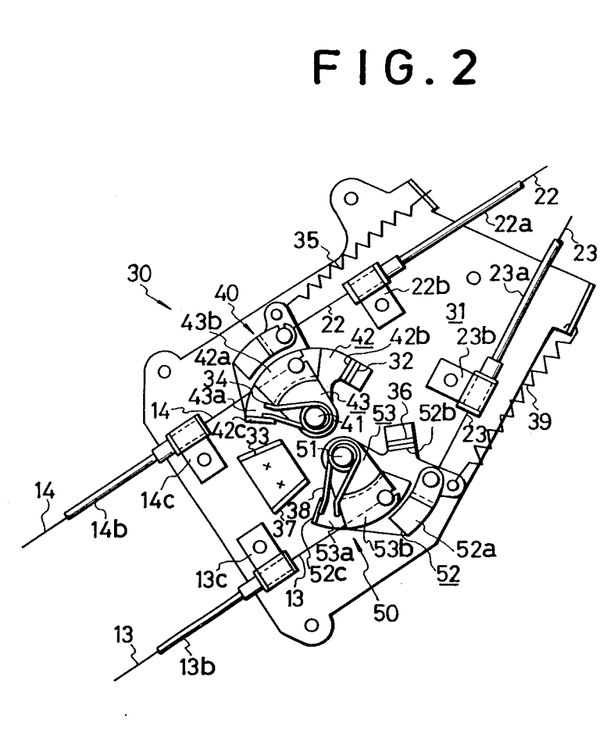
FIG. 2 is a front view of the linkage of FIG. 1 when the door is closed, or in other words, in the no-work condition.

As shown in FIG. 2, linkage 30 is comprised of base 31, which is fixed to the sliding door 20, and a closing side linkage member 40 and an opening side linkage member 50 pivotally attached to the base 31 through pivot stem 41 and 51.

Outer case 14b of closing cable 14, which is on the closing side linkage member 40, is connected to base 31 by fixture 14c. Outer case 13b of opening cable 13, which is on the opening side linkage member 50, is connected to base 31 by fixture 13c.

Closing linkage member 40 lies between and functions as a connection for closing cable 14 and closing linkage cable 22. This linkage member 40 comprises a first sector lever 42, to which closing linkage cable 22 is connected, and a second sector lever 43, to which the closing cable 14 is connected. The second sector lever 43 is laminated onto the first sector lever 42. The first sector lever 42 has cable connection 42a for the closing linkage cable 22 formed on the outer periphery thereof, one or first side end 42b adapted to make contact with a first stopper 32 which is fixed to base 31, and the other or second side end 42c adapted to come in contact with end 43a of the second sector lever 43 when sector lever 43 is functioning. End 42c faces a second stopper 33 which is fixed to base 31.

Second sector lever 43 is biased by first spring 34 such that its end 43a is separated from second side end 42c when the closing cable 14 is loosened. Formed on the outer edge of sector lever 43 is cable connection 43b to which closing-cable 14 is connected.

Provided between the outer periphery, specifically as radially outer projection thereof, of first sector lever 42 and the base 31, specifically an edge portion on the side of cable 22, is second spring 35 which biases first sector lever 42 so as to separate second end 42c from stopper 33.

The opening linkage member 50 is similar in construction to that of the closing linkage member 40. That is, opening linkage member 50 lies between and functions as a connection for the opening cable 13 and the opening linkage cable 23 and comprises first and second sector levers 52 and 53. The opening linkage cable 23 is connected to the first sector lever 52, and on top of sector lever 52 is the second sector lever 53, to which opening cable 13 is connected. Formed on the outer periphery of first sector lever 52 is cable connection 52a to which opening linkage cable 23 is connected. One side end 52b is adapted to make contact with a first stopper 36 fixed to base 31. The other side end 52c is adapted to make contact with end 53a of second sector lever 53 when second sector lever 53 is functioning. End 52c faces a second stopper 37 fixed to base 31.

Second sector lever 53 is biased by first spring 38 such that its end 53a is separated from the second side end 52c of first sector lever 52 when the opening cable 13 is loosened. Formed on the outer edge of sector lever 53 is cable connection 53b to which opening cable 13 is connected.

Provided between the outer periphery, specifically a radialy outer projection thereof, of first sector lever 52 and the base 31, specifically an edge portion on the side of cable 23, is second spring 39, which biases first sector lever 52 to separate second end 52c from second stopper 37.

Figure 7:
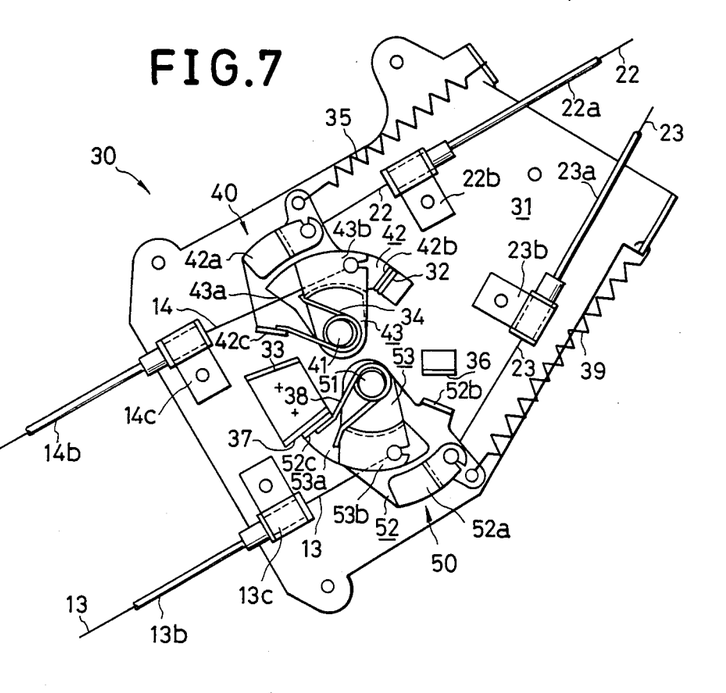
FIG. 7 is a front elevational view of the linkage when the door is open of the example of FIG. 1.

FIG. 2 shows the opening-closing mechanism when it is in the no-work condition. In the closing linkage member 40, first sector lever 42 is pulled by the force of second spring 35 so that first side end 42b is brought into contact with first stopper 32. The biasing force of second spring 35 is relatively strong enough to overcome the resistance in the door motion. First sector lever 42 is also pulled by the closing linkage cable 22 as set forth hereinafter. Second sector lever 43 is pulled by the closing cable 14, and at the same time pushed in the opposite direction by the biasing force of first spring 34. Accordingly, although end 43a comes in contact with or adjacent to second side end 42c of first sector lever 42, as shown in FIG. 2, when the closing cable 14 pulling second sector lever 43 is loosened, first spring 34 rotates second sector lever 43 to take up slacking as shown in FIG. 7.

In the opening linkage member 50, first sector lever 52 is pulled by the force of second spring 39 so that end 52b is brought into contact with first stopper 36. The biasing force of second spring 39 is relatively strong enough to overcome the resistance in the door motion. First sector lever 52 is also pulled by the opening linkage cable 23 as set forth hereinafter. Second sector lever 53 is pulled by the opening cable 13, and at the same time pushed in the opposite direction by the biasing force of first spring 38. Accordingly, although end 53a of second sector lever 53 comes in contact with or adjacent to end 52c of first sector lever 52 as shown in FIG. 2, when the opening cable 13 pulling second sector lever 53 is loosened, second spring 39 rotates second sector lever 53 to take up slacking as shown in FIG. 7.

As understood from FIG. 1 and FIG. 2, closing linkage cable 22 and opening linkage cable 23 extend from the opposite side from opening cable 13 and closing cable 14 of linkage 30 to door lock 60. Closing linkage cable 23 extends through outer case 22a. Outer case 22a is fixed to base 31 by fixture 22b. Opening linkage cable 23 extends through outer case 23a. Outer case 23a is fixed to base 31 by fixture 23b. Door lock means 60 may be a conventional one except for its power receiving portion as explained hereinafter.

Figure 3:
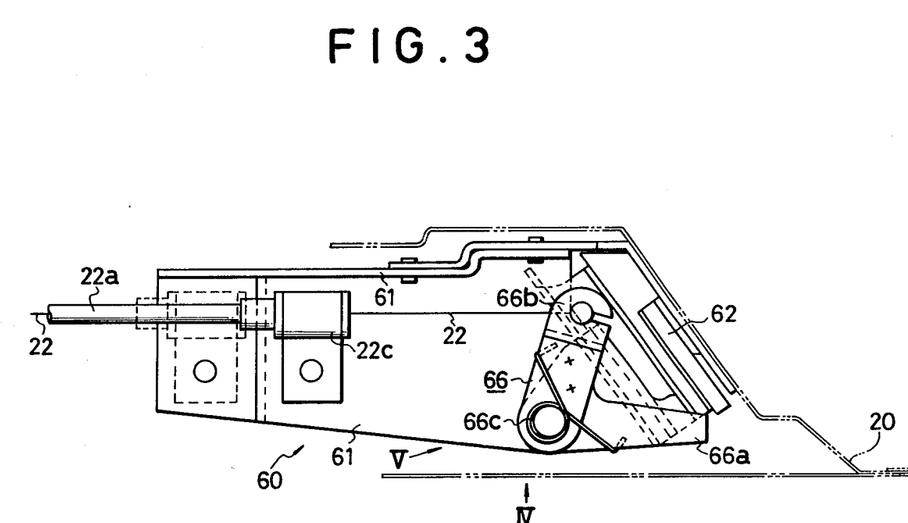
FIG. 3 is a plan view of the door lock and its neighboring parts of the example of FIG. 1.

The several functioning parts of door lock means 60 are installed in base 61 which is fixed to sliding door 20. In other words, latch 62, pawl 63, open lever 64, first intermediate lever 65, and locking lever 66 etc. are attached to base 61. Latch 62 is pivotally supported so that it mates with striker 18 which is fixed to the opening of vehicle body 10. Pawl 63 is adapted to be engaged with latch 62. Open lever 64 is fixed to pawl 63.

Figure 4:
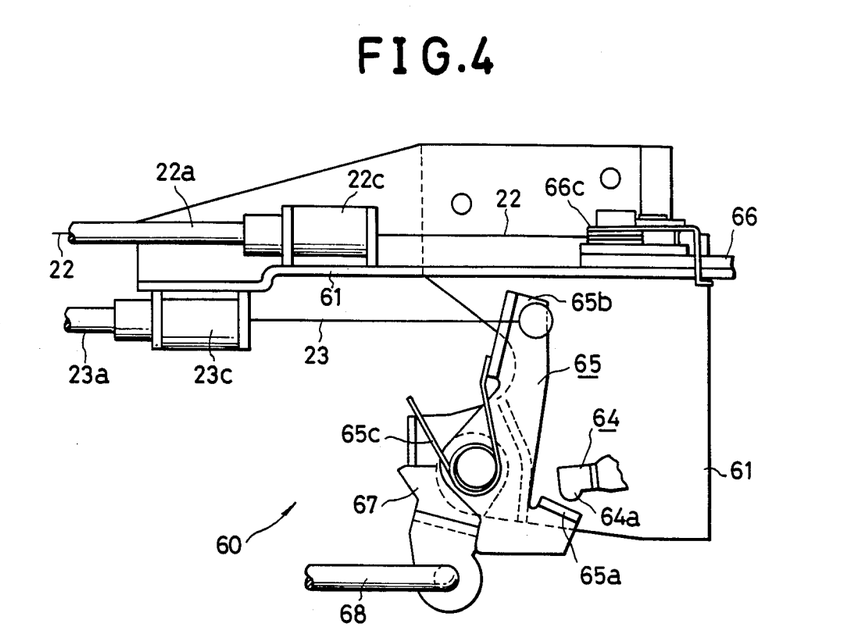
FIG. 4 is a view in the direction of arrow IV of FIG. 3.
Figure 5:
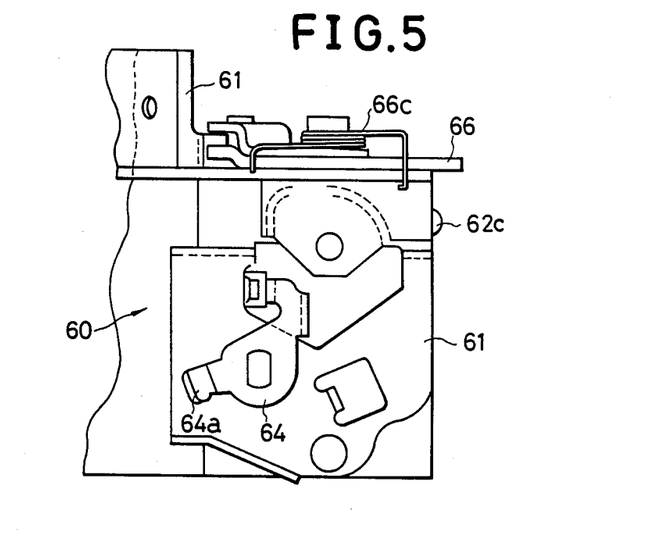
FIG. 5 is a view in the direction of arrow V of FIG. 3.
Figure 6:
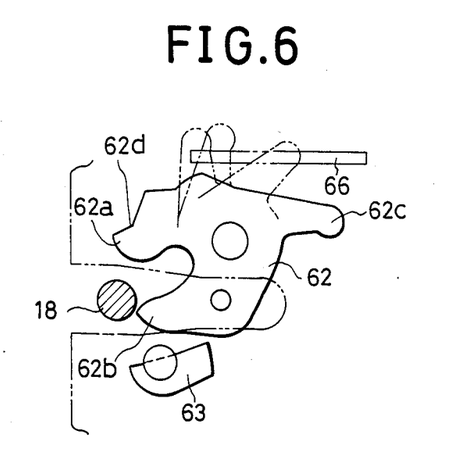
FIG. 6 is a plan view of the latch and its neighboring parts.

Latch 62 as can be seen in FIG. 6 is fork-shaped and is comprised of first edge 62a which mates with striker 18, second and fourth edges 62b and 62d which engage and disengage with pawl 63 in the half-latched and full-latched positions, and third edge 62c. As can be seen in FIG. 4 and FIG. 5, open lever 64 is comprised of edge 64a to be pushed by first edge 65a of intermediate lever 65.

As seen in FIG. 4, outer case 23a of opening linkage cable 23 faces first intermediate lever 65 and is fixed to base 61 by fixture 23c. The end of opening linkage cable 23 is connected to the input or second edge 65b of intermediate lever 65. Intermediate lever 65 is, through the force from spring 65c, biased in a direction so as to apply tension to opening linkage cable 23.

In order to rotate first intermediate lever 65 in the unlocking position (counter-clockwise in FIG. 4), second intermediate lever 67 which engages with lever 65 is pivotally provided concentric with first intermediate lever 65. Connection rod 68, which is connected to the second intermediate lever 67, extends to the locking-unlocking mechanism 70 (see FIG. 1).

Locking lever 66, as can be seen FIG. 3 and FIG. 6 is comprised of first edge 66a and second edge 66b. The first edge 66a is capable of engaging with third edge 62c of latch 62. During operation, edge 66a is located outside the locus of edge 62c of latch 62. Outer case 22a of closing linkage cable 22 faces lever 66, and is fixed to base 61 by fixture 22c. Closing linkage cable 22, which extends from outer case 22a, is connected to second edge 66b of lever 66. Lever 66 is, through the force from spring 66c, biased in a direction so as to apply tension to closing linkage cable 22.

As seen in FIG. 1, disposed close to locking-unlocking mechanism 70 are inside handle 78, locking-unlocking knob 74, and outside handle (not shown in Figures).

When the opening-closing mechanism is not in operation, clutch 12a cuts off the connection between motor 11 and drum 12 to which opening cable 13 and closing cable 14 are wound around. At this time, however, the sliding door can be opened or closed by hand without receiving any resistance from motor 11.

As shown by the imaginary lines in FIG. 1, with the sliding door 20 in the completely closed position, when motor 11 is in operation, clutch 12a makes connection between motor 11 and drum 12. Opening cable 13 is then pulled and closing cable 14 is released.

In the initial phase of opening sliding door 20, where sliding door 20 is locked, initially the linkage means 30 comes into operation until the condition as shown in FIG. 7. Specifacally, when opening cable 13 is pulled, cable connection 53b is pulled so that sector lever 53 of opening linkage member 50 is rotated. End 53a is pushed toward end 52c, and sector lever 52 pushed at end 52c by end 53a is also rotated against the biasing force of second spring 39. End 52b of sector lever 52 is separated from stopper 36 and end 52c becomes adjacent to and finally comes into contact with stopper 37, while opening linkage cable 23 is pulled by cable connection 52a.

The released and loosened closing cable 14 extends toward closing linkage member 40 and is pulled by cable connection 43b. At this time, sector lever 43, through the biasing force of first spring 34, rotates with respect to sector lever 42. From this, slack in the closing cable 14 is taken up and there is no effect on the closing linkage cable 22.

In door lock 60, as mentioned above, input edge 65b of intermediate lever 65 is pulled by the opening linkage cable 23. Edge 65a pushes edge 64a of open lever 64, and causes pawl 63 to rotate thereby unlocking the edge 62d to release latch 62. Latch 62 releases striker 18 and door lock means 60 is unlocked.

When the lock is unlocked, sliding door 20 can then be opened. Because end 52c of sector lever 52 in the opening linkage member 50 is in contact with stopper 37 and cannot rotate any further, opening cable 13 pulls sliding door 20 by way of drive bracket 21, whereby sliding door 20 is opened.

When closing the sliding door 20, as shown by the real lines in FIG. 1, with the sliding door in the completely open position, motor 11 is operated and closing cable 14 is pulled and opening cable 13 is released.

In the initial phase of closing the door, since a resistance to the door's motion is small, sector lever 42 of closing linkage member 40 is enough pulled by the force of second spring 35 not to rotate and, sliding door 20 to which linkage 30 is secured is pulled and moved in the closing direction by drive bracket 21.

Before the door is completely closed, edge 62b of latch 62 in door lock 60 comes into contact with striker 18. Latch 62 is rotated in the counter-clockwise direction as shown in FIG. 6 or in other words in the constrained direction, and mating edge 62a protrudes behind striker 18 and moves to the half-latched position.

When this happens, the force required to close sliding door 20 is large as mentioned above. Because closing cable 14 is pulled, sector lever 43 of closing linkage member 40 in linkage 30 is rotated and end 42c is pushed by end 43a and sector lever 42 is rotated against the biasing force of second spring 35 and closing linkage cable 22 is pulled.

When this happens, opening cable 13 loosens. However similar to the case of the opening linkage member 50 when opening the door, sector lever 53 of closing linkage 40 is rotated with respect to sector lever 52 through the biasing force of first spring 38 and the slack in opening-cable 13 is taken up with no effect on the opening linkage cable 23.

When the closing linkage cable 22 is pulled, second edge 66b of lever 66 in door lock means 60 is pulled and lever 66 is rotated in a counter-clockwise direction as shown in FIG. 3. At this time, because latch 62 is already in the half-latched positions, third edge 62c is in front of first edge 66a of lever 66 and first edge 66a protrudes to the rear of third edge 62c.

When sector lever 42 is rotated further, first edge 66a of lever 66 pushes third edge 62c of latch 62 from behind and latch 62 is rotated into the full-latched position.

In doing so, the rear edge of sliding door 20 is pulled in toward the vehicle and door lock 60 moves to the locked position, and sliding door 20 is completely closed. When the door is completely closed, the outer surface of the vehicle is continuously smooth.

Figure 8:
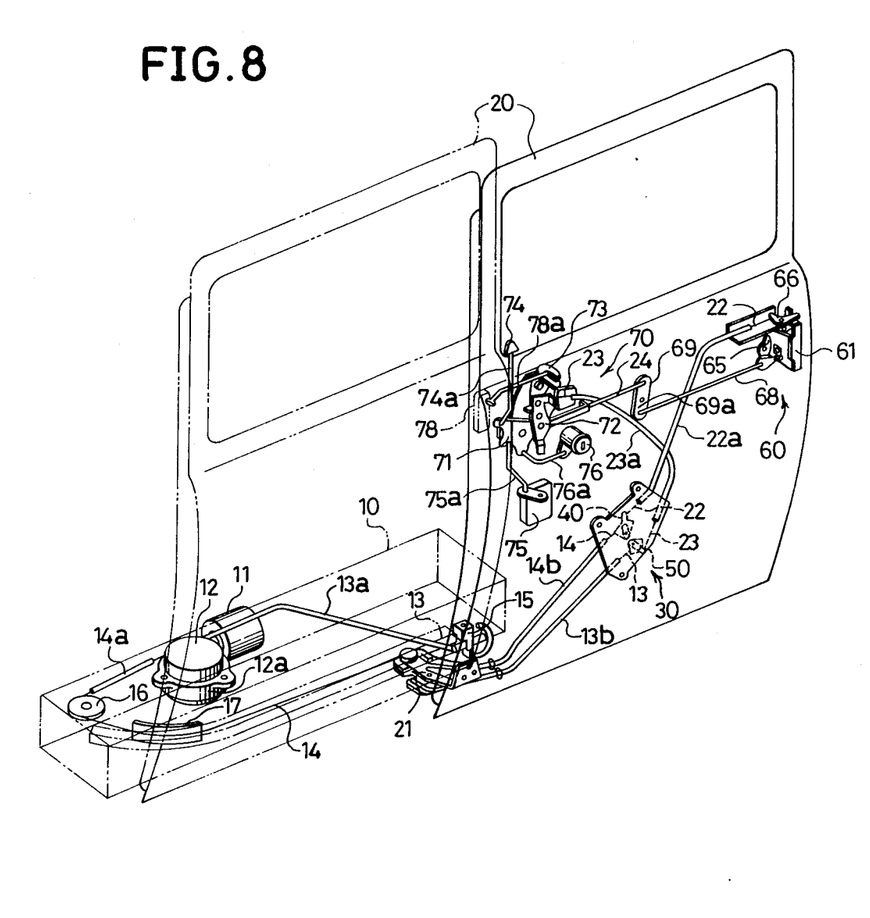
FIG. 8 is a schematic perspective view giving a second example of the sliding door employed in this invention.
Figure 9:
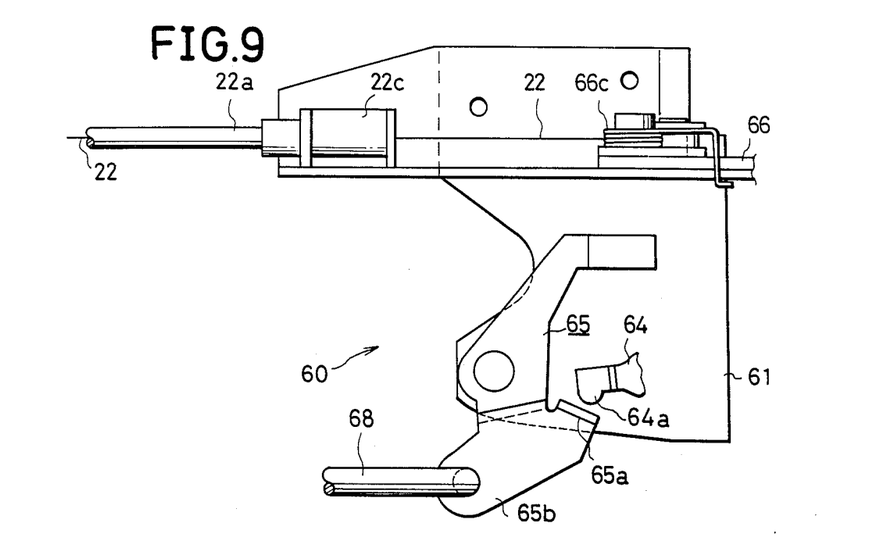
FIG. 9 is a view similar to FIG. 4 of the example of FIG. 8.

FIG. 8 shows a second example of this invention. Except for the connection of the opening linkage cable to locking-unlocking mechanism 70, the rest of the construction of the mechanism of FIG. 8 is substantially the same as FIG. 1.

As shown in FIG. 8, in the second example, closing linkage cable 22 goes through and is directed by outer case 22a in extending to door lock means 60, but opening linkage cable 23 goes through and is directed by outer case 23a in extending to locking-unlocking mechanism 70. Also rod 68 leading to locking-unlocking mechanism 70 is connected to input edge 65b of intermediate lever 65.

Figure 10:
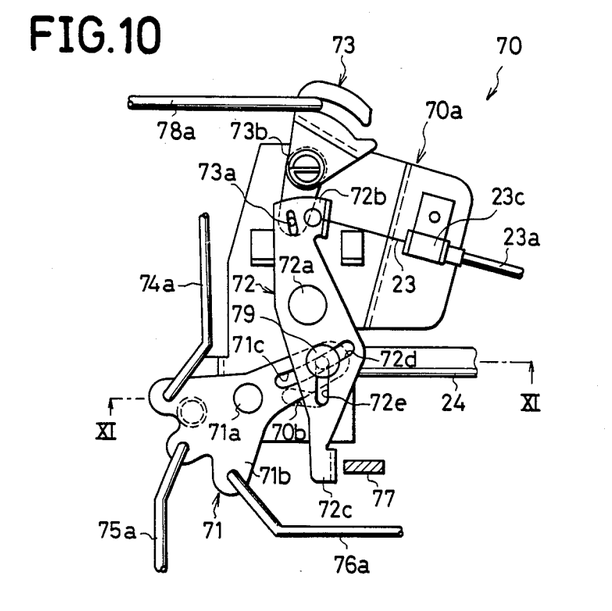
FIG. 10 is a plan view of the locking-unlocking mechanism used in the example of FIG. 8.
Figure 11:
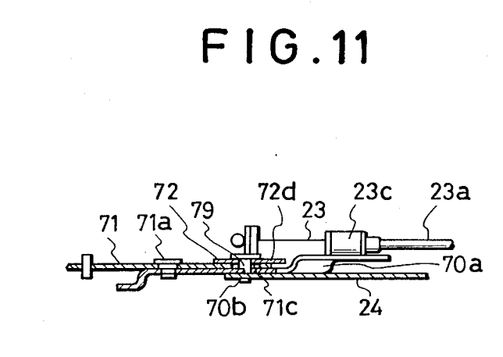
FIG. 11 is a cross-sectional view taken along line XI—XI of FIG. 10.

As can be seen in FIG. 8, FIG. 10, and FIG. 11, locking-unlocking mechanism 70 is comprised of locking-unlocking lever 71, unlocking lever 72 and inside lever 73 each pivotally connected on base 70a.

Locking-unlocking lever 71 pivots by way of pivot stem 71a reversely into the lock position and the unlock position. Edge 71b of lever 71 is connected to first rod 74a having at its top end locking-unlocking knob 74, second rod 75a which is connected to locking unlocking actuator 75, and third rod 76a which is connected to key cylinder 76.

Unlocking lever 72 has a first edge 72b to which cable 23 is connected, and second edge 72c which faces arm 77 of the outside handle.

Locking-unlocking lever 71 and unlocking lever 72 are connected by way of pin 79. Pin 79 fits slidably into the grooves formed in base 70a, locking-unlocking lever 71, and unlocking lever 72.

Locking-unlocking lever 71 is formed with locking-unlocking guide groove 71c. When lever 71 is in the unlock position, guide groove 71c is concentric with pivot stem 72a of unlocking lever 72. Unlocking lever 72 is formed with locking groove 72d, concentric with pivot stem 72a, and unlocking groove 72e, concentric with pivot stem 71a. Base 70a is formed with guide groove 70b, which runs along the locus of motion of locking-unlocking pin 79.

Outer case 23a of opening linkage cable 23 faces first edge 72b of unlocking lever 72, and is fixed to base 70a by fixture 23c. The end of opening linkage cable 23 is connected to first edge 72b. Spring 73b is wound around the pivot stem of inside lever 73. Through the biasing force of this spring, locking-unlocking lever 71 and inside lever 73 are biased in a direction so as to apply tension to opening linkage cable 23. Rod 78a is connected to inside handle 78.

Link 24 transmits the motion of locking-unlocking pin 79. One end of link 24 is connected to pin 79. The other end of link 24 extends to bell crank 69 to which rod 68 also extends from door lock 60. It should be noted in the drawing that one end of crank arm 69a is connected to rod 68 and the other end is connected to the end of link 24.

In locking-unlocking mechanism 70, when in the lock condition as shown in FIG. 10, even if opening linkage cable 23 is pulled, locking-unlocking pin 79 only moves along locking groove 72d of unlocking lever 72 and does not have any other motion. It swings wide and therefore motion is not transmitted to door lock 60. Therefore the door cannot be unlocked and thus sliding door 20 cannot be opened. Even if any one of the cables were pulled by some object from the outside, sliding door 20 still cannot be opened.

Either one of locking-unlocking knob 74, actuator 75, and key cylinder 76, by way of either one of knob rod 74a, auto-rod 75a, and key rod 76a, cause locking-unlocking lever 71 to rotate in a clockwise direction, as shown in FIG. 10. When the lever is rotated into the unlock position, locking-unlocking pin 79 is pushed along unlocking guide groove 71c and moves inside of unlocking groove 72e of unlocking lever 72, and consequently locking-unlocking mechanism 70 is unlocked.

In the unlock position, when opening linkage cable 23 pulls first edge 72b of locking-unlocking lever 72, locking-unlocking pin 79 moves along unlocking groove 72e to pull link 24. When this happens, crank arm 69a of bell crank 69 is rotated and rod 68 is pulled.

In door lock 60, input edge 65b of intermediate lever 65 is pulled by rod 68. After that, motion of all the parts is identical to that of the first example.

While preferred embodiments of this invention have been shown and described, it will be appreciated that other embodiments will become apparent to those skilled in the art upon reading this disclosure, and, therefore, the invention is not to be limited by the disclosed embodiments.

For example, in the afore-mentioned example, a pair of linkage members 40 and 50 are used in the linkage, but instead of the linkage members 40 and 50 each comprising sector levers, a single yoke member can be used such that it is biased in a rotating direction by a spring at the center thereof wherein a pair of opening and closing cables 13 and 14 and a pair of opening and closing linkage cables 23 and 24 are connected to the opposite end portions of the yoke.

What is claimed is:

1. An apparatus for opening and closing a sliding door mounted to a vehicle body, comprising a motor means fixedly mounted to said vehicle body for outputing power to move said sliding door, a linkage means secured to said sliding door for receiving said power from said motor, a door lock means having a latch means for completely closing said sliding door, said door lock means for receiving part of said power from said motor through said linkage means to lock and unlock said latch means, a first pair of cable means for transmitting said power from said motor to said linkage means, a second pair of cable means in correspondence with said first pair of cable means for transmitting said part of said power from said motor through said linkage means to said door lock means, and said linkage means being adapted to transmit said part of said power from said motor from each of said first pair of cable means to the corresponding one of said second pair of cable means and to take up slack in each of said first and second pairs of cables means when loosened.

2. The apparatus of claim 1, wherein each of said linkage means comprises a base having first and second stopper means, a pair of linkage members each comprising a first lever means and a second lever means, and a common stem means, said second lever means being laminated onto first lever means, said first and second lever means being rotatable between said first and second stopper means around said common stem means, said first lever means having a cable connection to which one of said second pair of cable means is connected at one end thereof with the other end thereof extended to said door lock means, said first lever means further having a first side end adapted to come into contact with said first stopper means and a second side end adapted to come in contact with said second stopper means, said second lever means having a cable connection to which one of said first pair of cable means is connected at one end thereof with the other end thereof extended to said motor, said second lever means further having first side end positioned adjacent to and spaced enough apart from said first side end of said first lever means to take up said slack, and a second side end adjacent to said second side end of said first lever means, a first spring means for providing a biasing force to separate said second side end of said second lever means from said second side end of said first lever means, and a second spring means for providing a biasing force to separate said second side end of said first lever means from said second stopper means.

3. The apparatus of claim 2, whererin said biasing force of said first spring means is adjusted to move said second lever means when said one of said first pair of cable means is loosened, and said biasing force of said second spring means is relatively high but adjusted such that said first lever means can be moved by said power from said motor in the opposite direction to said biasing force in correspondence with the motion of said door.

4. The apparatus of claim 2, wherein said power from said motor is transmitted to said sliding door through said linkage member which is fixed, when said power is relatively lower, through said second spring means, and when said power is relatively higher, through the contact between said second side end of said first lever member and said second stopper means.

5. The apparatus of claim 1, wherein said door lock means has a latch means and an open lever means, and said second pair of cable means are both connected to said door lock means.

6. The apparatus of claim 5, wherein one of said second pair of cable means is pulled to trigger said latch means to shift said door lock means to a latch condition, while the other is pulled to trigger said open lever to release said latch means from said latch condition.

7. The apparatus of claim 1, further comprising a locking-unlocking mechanism provided to cut off and connect the power transmission in said second pair of cable means, wherein one of said second pair of cable means is connected to said door lock means and the other is connected to said locking-unlocking mechanism.

8. The apparatus of claim 7, wherein said door lock means has a latch means to place said door lock means under either one of latch condition and non-latch condition and an open lever means to release said latch means from said latch condition, said locking-unlocking mechanism has a lever means to cut off and connect the power transmission to said open lever, said one of said pair of cable means is pulled to trigger said latch means to shift said door lock means to said latch condition, while the other is pulled to trigger said lever means.

9. An apparatus for opening and closing a sliding door mounted to a vehicle body, comprising a motor fixedly mounted to said body for outputting power to move said sliding door, a linkage means secured to said sliding door for receiving said power from said motor, a pair of door opening and closing cables for transmitting said power from said motor to said linkage, a drum for having one end of each of said cables connected thereto so as to wind and rewind said cables in the opposite directions to each other, the other end of each of said cables being connected to said linkage means to move said sliding door when each of said cables is pulled by said motor, a door lock means having a latch means for completely closing said sliding door, said door lock means for receiving part of said power from said motor through said linkage means to lock and unlock said latch means, a pair of opening and closing linkage cables having one end thereof connected to said linkage means and the other end thereof connected to said door lock means so as to transmit said part of said power from said motor to said door lock means, and said linkage means having a pair of linkage members each for transmitting said power from said motor to said door lock means and said sliding door and for preventing slack in each said cable.

10. An apparatus for opening and closing a sliding door mounted to a vehicle body, comprising a motor fixedly mounted to said body for outputting power to move said sliding door, a linkage means secured to said sliding door for receiving said power from said motor, a pair of door opening and closing cables for transmitting said power from said motor to said linkage means, a drum for having one end of each of said cables connected thereto so as to wind and rewind said cables in the opposite directions to each other, the other end of each of said cables being connected to said linkage means to move said sliding door when each of said cables is pulled by said motor, a door lock means having a latch means for completely closing said sliding door, said door lock means for receiving part of said power from said motor through said linkage means to lock and unlock said latch means, a pair of opening and closing linkage cables having one end thereof connected to said linkage means, one of said pair of opening and closing linkage cables having the other end thereof connected to said door lock means, the other of said pair of opening and closing linkage cables having the other end thereof connected to a locking-unlocking mechanism adapted to cut off and connect the power transmission to said door lock means, and said linkage means having a pair of linkage members each for transmitting said power from said motor to said door lock means and said sliding door and for preventing slack in each said cable.

11. A sliding door opening-closing mechanism for a vehicle comprising a door lock means having a latch, a locking lever and an open lever, a linkage means and a pair of opening and closing cable means through which the opening and closing motion is operated through said cable means, when the door is completely closed the outer surface of the vehicle is continuously smooth and when the door is opened it protrudes from the vehicle surface, the opening cable means and the closing cable means being pulled on the inside of the sliding door, said opening cable means being connected through said linkage means to said open lever which is furnished in said door lock means, and said closing cable means being connected through said linkage means to said locking lever causing the lever to rotate and forcing it to move from the half-latched to the full-latched position; in opening the door, tension in said opening cable causes said door lock to come unlocked, and in closing the door, tension in said closing cable means causes motion of said locking lever moving said latch from the half-latched position to the full-latched position, causing said sliding door to be completely closed, wherein slack in said cable means is taken up by said linkage means.

12. A sliding door opening-closing mechanism for a vehicle comprising a door lock means having a latch, a locking lever and an open lever, a linkage means, a locking-unlocking mechanism for controlling said door lock means, and a pair of opening and closing cable means through which the opening and closing motion is operated through said cable means, when said door is completely closed the outside surface of the vehicle is continuously smooth and when opened the door protrudes from the vehicle surface with said opening cable means and closing cable means being pulled on the inside of the sliding door, said closing cable means being connected through said linkage means to said door lock means, said opening cable means being connected through said linkage means to said locking-unlocking mechanism, and the motion is transmitted from the opening cable means extending through the locking-unlocking mechanism to said open lever only when said locking-unlocking mechanism unlocks the door, wherein through the tension of the said opening cable the door is opened only when said door lock means is unlocked and through the tension of said closing cable said latch is forced to rotate from the half-latched position to the full-latched position, wherein slack in said cable means is taken up by said linkage means.

* * * * *